(12) United States Patent
Moeller

(10) Patent No.: US 7,362,977 B2
(45) Date of Patent: Apr. 22, 2008

(54) METHOD FOR REDUCTION OF NON-LINEAR INTRA-CHANNEL DISTORTIONS

(75) Inventor: Lothar Benedict Erhard Josef Moeller, Hazlet, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 659 days.

(21) Appl. No.: 10/262,374

(22) Filed: Sep. 30, 2002

(65) Prior Publication Data

US 2004/0062552 A1    Apr. 1, 2004

(51) Int. Cl.
*H04B 10/12* (2006.01)
*H04B 10/00* (2006.01)

(52) U.S. Cl. ............... 398/147; 398/152; 398/159

(58) Field of Classification Search .............. 359/249, 359/337.5, 499; 398/29, 65, 81, 147, 152, 398/192, 159, 148, 158
See application file for complete search history.

(56) References Cited

U.S. PATENT DOCUMENTS

| | | | | |
|---|---|---|---|---|
| 5,473,457 | A * | 12/1995 | Ono ....................... 398/185 |
| 5,930,414 | A * | 7/1999 | Fishman et al. .............. 385/11 |
| 6,266,457 | B1 * | 7/2001 | Jacob ......................... 385/11 |
| 6,330,383 | B1 * | 12/2001 | Cai et al. ..................... 385/37 |
| 6,380,533 | B1 * | 4/2002 | Jopson et al. ............... 250/225 |
| 6,385,357 | B1 * | 5/2002 | Jopson et al. ................. 385/11 |
| 6,459,515 | B1 * | 10/2002 | Bergano ...................... 398/79 |
| 6,717,706 | B2 * | 4/2004 | Miller et al. ................ 359/237 |
| 6,928,199 | B2 * | 8/2005 | Galstian et al. .............. 385/10 |
| 2001/0008452 | A1 * | 7/2001 | Sugihara et al. ............ 359/124 |
| 2001/0024538 | A1 * | 9/2001 | Khosravani et al. .......... 385/11 |
| 2001/0055437 | A1 * | 12/2001 | Khosravani et al. .......... 385/11 |
| 2002/0018266 | A1 * | 2/2002 | Ooi et al. ................... 359/161 |
| 2002/0060760 | A1 * | 5/2002 | Weiner ........................ 349/96 |
| 2002/0075477 | A1 * | 6/2002 | Yu et al. .................... 356/73.1 |
| 2002/0089718 | A1 * | 7/2002 | Penninckx et al. ......... 359/122 |
| 2002/0093643 | A1 * | 7/2002 | Moeller .................... 356/73.1 |
| 2002/0191285 | A1 * | 12/2002 | Damask et al. ............. 359/484 |
| 2003/0007216 | A1 * | 1/2003 | Chraplyvy et al. ......... 359/161 |
| 2003/0043445 | A1 * | 3/2003 | Miller et al. ................ 359/237 |
| 2003/0090768 | A1 * | 5/2003 | Liu et al. .................... 359/183 |
| 2004/0037568 | A1 * | 2/2004 | Evangelides, Jr. ........... 398/159 |
| 2004/0042701 | A1 * | 3/2004 | Haustein et al. .............. 385/11 |
| 2004/0208605 | A1 * | 10/2004 | Bakhshi et al. ............. 398/147 |
| 2005/0074037 | A1 * | 4/2005 | Rickard et al. ............. 370/537 |
| 2005/0147346 | A1 * | 7/2005 | Vaa et al. ..................... 385/27 |

OTHER PUBLICATIONS

S. Chandrasekhar, PMD Pre-distorted Signals for Reducing Non-linear Intra-channel caused Imapirments, CLEO 2002, pp. 461-462.*
"Intra-Channel Cross-Phase Modulation and Four-Wave Mixing in High-Speed TDM Systems," R.-J. Essiambre et al., Electronics Letters, vol. 35, No. 18, Sep. 2, 1999, pp. 1576-1578.
"Dependence of Non-Linear Depolarization on the Overall Polarization of PMD Distorted WDM Signals," L. Möller et al., Proc. 27$^{th}$ Eur. Conf. On Opt. Comm. (ECOC'01—Amsterdam), Tu.A.3. 6, pp. 214-215.
"PMD-Induced Reduction of Nonlinear Penalties in Terrestrial Optical Fiber Transmission," E. Ibragimov et al., WL3, pp. 195-197.
L. Moeller et al., "PMD Pre-Distorted Signals for Reducing Non-linear Intra-Channel Caused Impairments", CLEO 2002, Technical Digest Postconference Edition, pp. 461-462.

* cited by examiner

Primary Examiner—M. R. Sedighian

(57) ABSTRACT

A method for reducing intra-channel, non-linear distortions of an optical signal resulting from non-linear fiber propagation includes applying a polarization mode dispersion (PMD) pre-distortion to an optical signal such that the PMD pre-distortion produces two replica signals of the optical signal spaced by a differential group delay (DGD). The replica signals are adapted for transmission via an optical fiber. The DGD spacing is selected to reduce intra-channel, non-linear distortions imparted by the optical fiber.

17 Claims, 2 Drawing Sheets

100

METHOD FOR REDUCTION OF NON-LINEAR INTRA-CHANNEL DISTORTIONS

FIELD OF THE INVENTION

This invention relates to the field of optical transmission systems and, more specifically, to the reduction of non-linear, intra-channel distortions in transmission systems.

BACKGROUND OF THE INVENTION

The maximum reach of long-haul, high-speed transmission systems is limited by non-linear signal distortions. Non-linear signal distortions can typically be separated into two categories; namely inter-channel non-linear signal distortions and intra-channel non-linear signal distortions. For ultra-long transmission systems, e.g., 40 Gb/s, intra-channel effects within a single channel, as opposed to inter-channel effects between WDM channels, are the main sources of non-linear signal distortion.

Typically, the three major sources of intra-channel, non-linear signal distortions are four wave mixing, cross-phase modulation, and self phase modulation. Four wave mixing is a non-linear phenomenon involving generation of a new signal starting from the interaction between existing signals. The existing signals can be the various frequency components of an optical signal in a transmission system. Four wave mixing is especially pronounced in optical fibers having low dispersion within the signal band, i.e., within the range of signal wavelengths.

Cross-phase modulation occurs when signals induce phase distortion on co-propagating frequencies and group-velocity dispersion converts this phase distortion into amplitude distortion. Cross-phase modulation is especially troublesome in fibers having relatively high dispersion within the signal band.

Self-phase modulation is introduced or experienced when an optical signal of high power is launched into a standard fiber. The self-phase modulation effect appears as a pulse broadening and associated pulse distortion within individual wavelength channels. All of these non-linear signal distortions restrict the usable bandwidth of each optical carrier in a transmission system.

SUMMARY OF THE INVENTION

The present invention advantageously provides a method for reduction of intra-channel distortions resulting from non-linear fiber propagation.

In one embodiment of the invention, a method for reducing intra-channel, non-linear distortions of an optical signal resulting from non-linear fiber propagation includes applying a polarization mode dispersion (PMD) pre-distortion to an optical signal such that the PMD pre-distortion produces two replica signals of the optical signal spaced by a differential group delay (DGD). The replica signals are adapted for transmission via an optical fiber. The DGD spacing is selected to reduce intra-channel, non-linear distortions imparted by the optical fiber. The method of the present invention can further include applying a PMD post-compensation to the optical signal.

In another embodiment of the present invention, a transmission system includes at least one transmitter, for generating an optical signal, at least one receiver, for receiving the optical signal, and a means for applying PMD pre-distortion to the optical signal, the PMD pre-distortion producing two replica signals spaced by a differential group delay (DGD). The replica signals are adapted for transmission via an optical fiber. The DGD spacing is selected to reduce intra-channel, non-linear distortions imparted by said optical fiber.

BRIEF DESCRIPTION OF THE DRAWINGS

The teachings of the present invention can be readily understood by considering the following detailed description in conjunction with the accompanying drawings, in which:

FIG. 2a graphically depicts an eye diagram of an optical signal at the receiver of the transmission system of FIG. 1 without PMD pre-distortion and a Differential Group Delay equal to zero;

FIG. 2b graphically depicts an eye diagram of an optical signal at the receiver of the transmission system of FIG. 1 after a PMD pre-distortion;

FIG. 2c graphically depicts the corresponding amplitude pulse fluctuations of the optical signal of FIG. 2a;

FIG. 2d graphically depicts the corresponding amplitude pulse fluctuations of the optical signal of FIG. 2b.

To facilitate understanding, identical reference numerals have been used, where possible, to designate identical elements that are common to the figures.

DETAILED DESCRIPTION OF THE INVENTION

Figure 1:
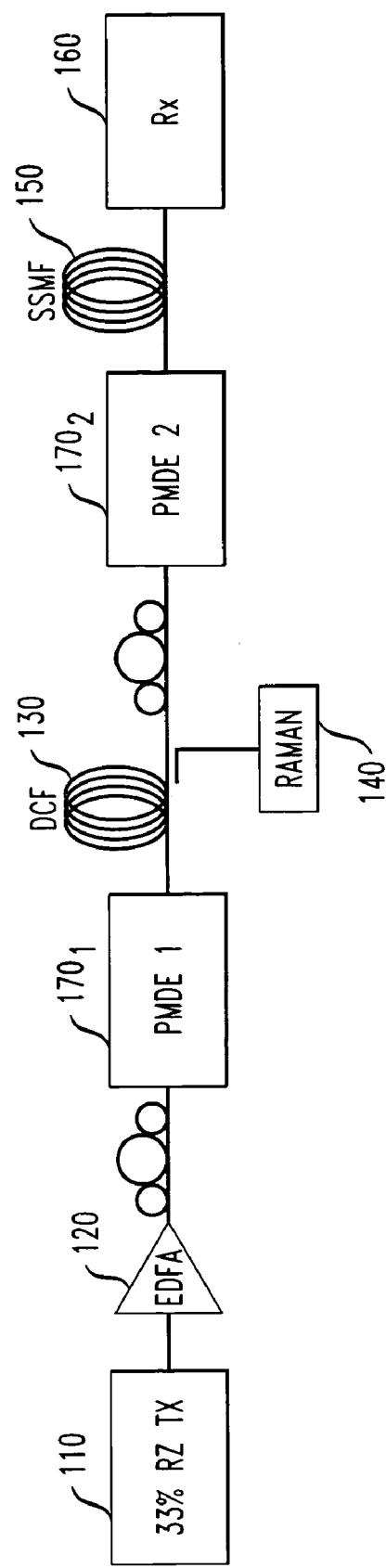
FIG. 1 depicts a block diagram of a single channel transmission system for RZ transmission in a 10 Gb/s 33% RZ single span, in which PMD pre-distortion can be provided to an optical signal in accordance with the present invention.

The present invention advantageously provides a method for reducing signal distortion resulting from non-linear fiber propagation. By applying a polarization mode dispersion (PMD) pre-distortion to a signal, the signal's pulse peak power is reduced. In this manner, the magnitude of non-linear effects decreases, transmission performance increases, and optical communication is extended. Although the present invention will be described within the context of a single channel transmission system, it will be appreciated by those skilled in the art that the present invention can be advantageously implemented in transmission systems with multiple channels.

For ultra-long transmission systems, e.g., 40 Gb/s, the highly non-linear signal propagation of RZ transmission is proven to be an advantageous link design for signal transmission. For such systems, the inventor determined that intra-channel effects within a single channel, as opposed to inter-channel effects between WDM channels, are the main non-linear distortion source. Thus, focusing on a single channel system reveals the main non-linear distortion sources.

Optical pulses in a transmission system rapidly overlap each other due to chromatic dispersion while propagating along a fiber. The resulting intensity variation generates signal distortions via the fiber Kerr nonlinearity. In a fiber with negligible PMD the propagation equations are given by:

$$\frac{\partial A_x}{\partial Z} + \beta_1 \frac{\partial A_x}{\partial t} + j/2\beta_2 \frac{\partial^2 A_x}{\partial t^2} + \alpha/2 A_x = j\Upsilon(|A_x|^2 + 2/3|A_y|^2)A_x \quad (1)$$

$$\frac{\partial A_y}{\partial Z} + \beta_1 \frac{\partial A_y}{\partial t} + j/2\beta_2 \frac{\partial^2 A_y}{\partial t^2} + \alpha/2 A_y = j\Upsilon(|A_y|^2 + 2/3|A_x|^2)A_y \quad (2)$$

wherein $A_x$, $A_y$, $\Upsilon$, $\alpha$, and $\beta_1$ stand for the envelope of the TE and TM polarized electrical field components, the Kerr nonlinearity, the fiber attenuation, and the group velocity, respectively, and $\beta_2$ is related to the chromatic dispersion of the fiber. With these equations in mind, the inventor determined the effects of PMD on the non-linear distortions of a signal caused by non-linear propagation through a fiber.

First order PMD results in a splitting of a pulse into two replicas spaced by a differential group delay (DGD). From equations (1) and (2) above, the inventor determined that the non-linear interaction, described by the right-hand side of equations (1) and (2), becomes weaker when the signal is distorted by PMD before entering a transmission fiber. As such, a signal split into two replicas, for example a TE and TM pulse, results in a reduction of the pulse peak power of each pulse. The reduction of the pulse peak power results in a reduction of the non-linear distortion of a signal as it propagates through a transmission fiber. An optimum spacing between the two pulses is given by a trade-off between the peak power reduction and field interference effects with pulses of previous and following transmitted signals.

Non-linear distortion reduction is maximized in accordance with the present invention when the fields $A_x$ and $A_y$, which represent two orthogonal polarization components, for example the TE and TM polarized electric field components, respectively, in equations (1) and (2), are equal in power and the DGD, depicting the pulse spacing between the two pulses of the split signal, substantially equals between 20 percent and 70 percent of the bit length in the transmission system.

In one embodiment of the present invention, the PMD pre-distortion is provided by propagating a signal through a PMD emulator (PMDE) comprising a combination of a polarization beam splitter for splitting a signal into two polarized electrical field components, a delay element for delaying one of the polarized electrical field components, and a polarization beam combiner, for recombining the two signal components. In another embodiment of the present invention, the PMD pre-distortion is provided by propagating a signal through a polarization maintaining fiber or any other fiber providing birefringence. In either embodiment, providing a PMD pre-distortion to a signal prior to entering a transmission fiber, in accordance with the present invention, advantageously reduces signal distortions resulting from non-linear fiber propagation.

After providing a PMD pre-distortion to a signal, it may be necessary to compensate for the PMD pre-distortion of a signal in a transmission system. As such, a PMD post-compensation is applied to the signal after transmission through a transmission fiber. Typically in ultra-long-haul transmission systems, e.g., 40 Gb/s systems (per channel), PMD post-compensation is already required even in the case of propagation through fibers with a low PMD, and therefore a required post-compensation of the PMD pre-distortion requires no significant add-ons in such a transmission system. Such PMD post-compensation is provided by propagating a signal through PMD compensators or PMD emulators and the like. Such PMD compensators should be powerful enough to provide PMD post-compensation equal in value to the PMD pre-compensation plus any PMD generated by propagation of a signal through a transmission fiber.

The method of reducing signal distortion in accordance with the present invention allows for an increase in overall signal power in transmission systems because of the reduction in the signal power resulting from the splitting of the signal pulse into two delayed field components. As such, the reach of a transmission system can be increased because the optical-signal-to-noise ratio (OSNR) levels of the signal pulses can be increased. Furthermore, because a signal will experience less non-linear distortions, less margin has to be allocated in a transmission system for the event of a coexistence of both non-linear distortions and PMD. The inventor proved the principles of the invention through numerical simulation and experimentation.

FIG. 1 depicts a block diagram of a single channel transmission system 100 for RZ transmission in a 10 Gb/s 33% RZ single span, wherein PMD pre-distortion can be provided to an optical signal in accordance with the present invention. The transmission system 100 includes a pulse transmitter (illustratively a 33% RZ transmitter) 110, an amplifier (illustratively an erbium-doped fiber amplifier) 120, a dispersion compensating fiber (DCF) (illustratively 12 km long) 130, a Raman pump 140, a standard single mode fiber (SSMF) 150, a receiver (illustratively a pre-amplified receiver with an electrical bandwidth of approximately 14 GHz) 160, and two PMD emulators $170_1$ and $170_2$ (collectively PMD emulators 170). The RZ transmitter 110 utilized in the transmission system 100 is dithered to avoid Brillouin scattering. The above parameters and elements were chosen to substantially emulate the propagation conditions of a 40 Gb/s transmission system with respect to non-linear interaction length, dispersion, and bit rate. Although some of the elements of the transmission system 100 in FIG. 1 are depicted as specific devices, other such devices that perform substantially similar functions as the specified elements can be substituted. For example, the first PMD emulator $170_1$ of the transmission system 100 of FIG. 1 can be a polarization maintaining fiber, or any other fiber providing birefringence, and the second PMD emulator $170_2$ can be a PMD compensator. Additionally, although the PMD emulators 170 in the transmission system 100 of FIG. 1 are depicted as being located directly before and after the DCF 130, the PMD emulators 170 can be located at greater distances from the DCF 130. Furthermore, although the transmission system 100 of FIG. 1 is shown as comprising two PMD emulators 170, the present invention can be advantageously implemented by utilizing combinations of PMD emulators or other such devices for providing a PMD pre-distortion and PMD post-compensation to a signal in accordance with the present invention.

In an experiment, a +15 dBm signal from the RZ transmitter 110 is input into the transmission system 100. The signal is first amplified by the amplifier 120 and subsequently propagates through the first PMD emulator $170_1$ wherein a PMD pre-distortion is added to the signal. The first PMD emulator $170_1$ split the signal into two orthogonal polarization components, in this experiment the TE and TM electric field components, with a DGD of between 20 to 70 percent of the bit length, in this experiment 30 ps. The signal then propagates through the DCF 130 having a dispersion of −1400 ps/nm and negligible PMD. As previously described, PMD post-compensation is needed even in cases of fibers with low PMD. As such the signal then propagates through the second PMD emulator $170_2$ for PMD post-compensation after non-linear transmission through the DCF 130. The PMD emulator provides PMD post-compensation equal to the PMD pre-distortion. Subsequently, the chromatic dispersion of the 12 km long DCF 130 is fully compensated by the SSMF 150 in which strictly linear propagation takes place. The signal is then output to the receiver 160.

Figure 2:
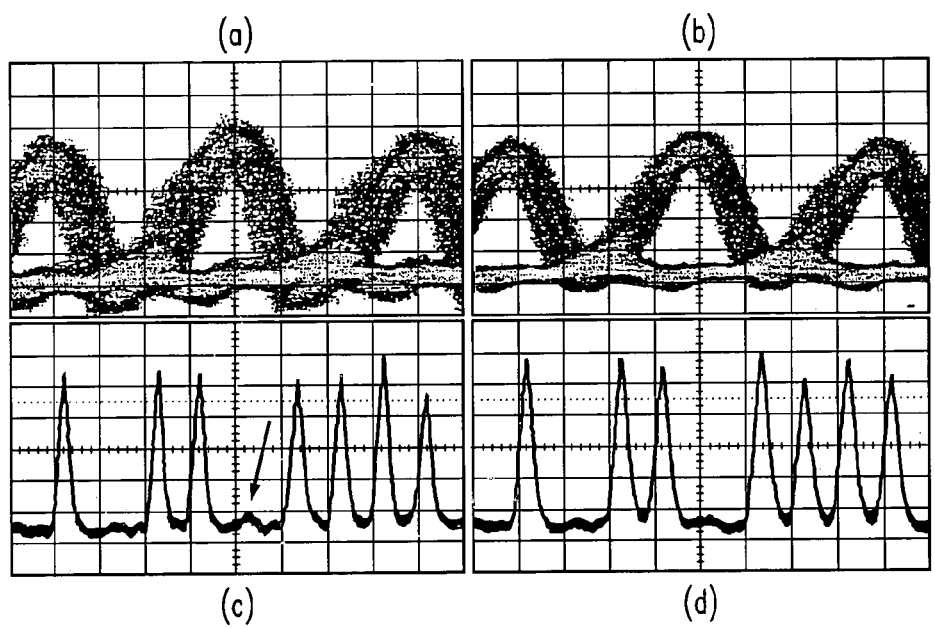

For the purposes of comparison, graphs of an optical signal at the receiver 160 are depicted in the following figures for the case of no PMD pre-distortion and for the case of PMD pre-distortion in accordance with the present invention. In this case, a $2^{31}$-1 PRBS signal is used. FIG. 2a graphically depicts an eye diagram of the optical signal at the receiver 160 with no PMD pre-distortion applied and a Differential Group Delay equal to zero. FIG. 2b graphically depicts an eye diagram of an optical signal at the receiver 160 after a PMD pre-distortion with a Differential Group Delay equal to 30 picoseconds was applied to the optical signal. A comparison of FIG. 2a and FIG. 2b clearly demonstrates a narrowing of the pulse flank widths when a signal is PMD pre-distorted in accordance with the present invention. The narrowing of the pulse flank widths is a clear indication of a reduction of intra-channel non-linear distortions in the transmitted signal when the signal is PMD pre-distorted.

FIG. 2c graphically depicts the corresponding amplitude pulse fluctuations of the optical signal of FIG. 2a. FIG. 2d graphically depicts the corresponding amplitude pulse fluctuations of the optical signal of FIG. 2b. In this case a short bit pattern ($2^7$-1) was used to analyze the non-linear interaction. A comparison of FIG. 2c and FIG. 2d clearly demonstrates an improvement in the amplitude pulse fluctuations when a signal is PMD pre-distorted in accordance with the present invention. The improvement in the amplitude pulse fluctuations is a clear indication of a reduction in intra-channel non-linear distortions in the transmitted signal when the signal is PMD pre-distorted.

Pulse amplitude fluctuations and ghost pulses (indicated by an arrow in FIG. 2c) indicate intra-channel four-wave mixing while the jitter in the eye diagrams results from intra-channel cross-phase modulation. Both, intra-channel four-wave mixing and intra-channel cross-phase modulation appear reduced in the graphs of FIG. 2 for the PMD pre-distorted signals.

Figure 3:
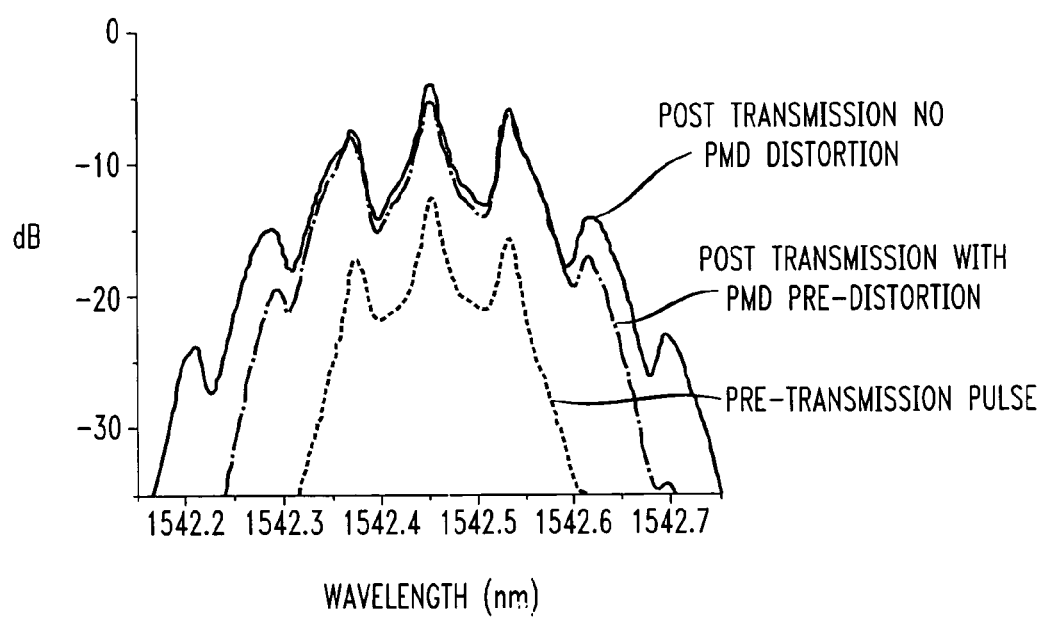
FIG. 3 graphically depicts the spectra of an optical pulse before and after transmission through the transmission system of FIG. 1.

FIG. 3 graphically depicts the spectra of an optical pulse before and after transmission through the transmission system 100 of FIG. 1. The narrowest pulse spectrum is the spectrum of the optical pulse before propagation through the transmission system 100 of FIG. 1. The broadest spectrum is the spectrum of the optical pulse after transmission through the transmission system 100 with no PMD pre-distortion added. The pulse spectrum in between the broadest and narrowest spectra in FIG. 3 is a spectrum of the optical pulse after transmission through the transmission system 100 wherein a PMD pre-distortion was applied to the optical signal. The overlapped spectra illustrating a reduction in spectral broadening are an indication of a reduction of intra-channel self-phase modulation in the case of the PMD pre-distorted signal.

Although the above embodiment of the invention was described within a single channel transmission system for RZ transmission in a 10 Gb/s 33% RZ single span, it will be appreciated by those skilled in the art that the present invention can be advantageously implemented in any high-speed, single channel or multi-channel system wherein a reduction of signal distortion resulting from intra-channel non-linear fiber propagation is desired.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
    applying a polarization mode dispersion (PMD) pre-distortion to an optical signal prior to propagating said optical signal in an optical transmission fiber, said (PMD) pre-distortion producing two replica signals spaced by a differential group delay (DGD);
    propagating said replica signals in the optical transmission fiber capable of imparting intra-channel, non-linear signal distortions;
    said DGD spacing selected to reduce said intra-channel, non-linear distortions imparted by said optical fiber.

2. The method of claim 1, wherein said two replica signals comprise orthogonal polarization components.

3. The method of claim 2, wherein said two orthogonal polarization components comprise respective TE and TM polarization components.

4. The method of claim 1, wherein said (PMD) pre-distortion is applied to said optical signal using at least one PMD emulator.

5. The method of claim 1, further comprising applying a (PMD) post-compensation to said optical signal.

6. The method of claim 5, wherein said (PMD) post-compensation is applied to said optical signal using at least one PMD compensator.

7. The method of claim 1, wherein said two replicas of the optical signal are substantially equal in power.

8. The method of claim 1, wherein the DGD is between 20percent and 70 percent of a bit length of said optical signal.

9. The method of claim 1, wherein said DGD is equal to 30 picoseconds.

10. The method of claim 1, wherein the DGD is equal to the full-width-half-max (FWHM) of the pulse intensity of said optical signal.

11. The method of claim 1, wherein said optical signal is a return-to-zero formatted signal.

12. A method for reducing intra-channel, non-linear distortions of an optical signal resulting from non-linear fiber propagation, comprising:
    applying a polarization mode dispersion (PMD) pre-distortion to said optical signal to produce two replica signals spaced by a differential group delay (DGD) prior to propagating through a transmission fiber;
    wherein said DGD spacing is selected such tat subsequent non-liner fiber propagation of said optical signal through said transmission fiber results in a reduction of said intra-channel, non-linear distortions to said optical signal compared to a case where no PMD pre-distortion is applied.

13. The method of claim 12, wherein said PMD pre-distortion is applied to said optical signal using at least one PMD emulator.

14. The method of claim 12, further comprising applying a PMD post-compensation to said optical signal.

15. The method of claim 14, wherein said PMD post-compensation is applied to said optical signal using at least one PMD compensator.

16. A transmission system, comprising:
at least one transmitter, for generating an optical signal;
at least one receiver, for receiving said optical signal; and
a means for applying PMD pre-distortion to said optical signal to produce two replica signals spaced by a differential group delay (DGD) prior to propagating said signal in an optical transmission fiber of the system;
a means for propagating said replica signals in an optical transmission fiber;
said DGD spacing selected to reduce intra-channel, non-linear distortions imparted by said optical transmission fiber.

17. The transmission system of claim 16, further comprising:
a means for applying a (PMD) post-compensation to said optical signal.

* * * * *